Patented Jan. 24, 1928.

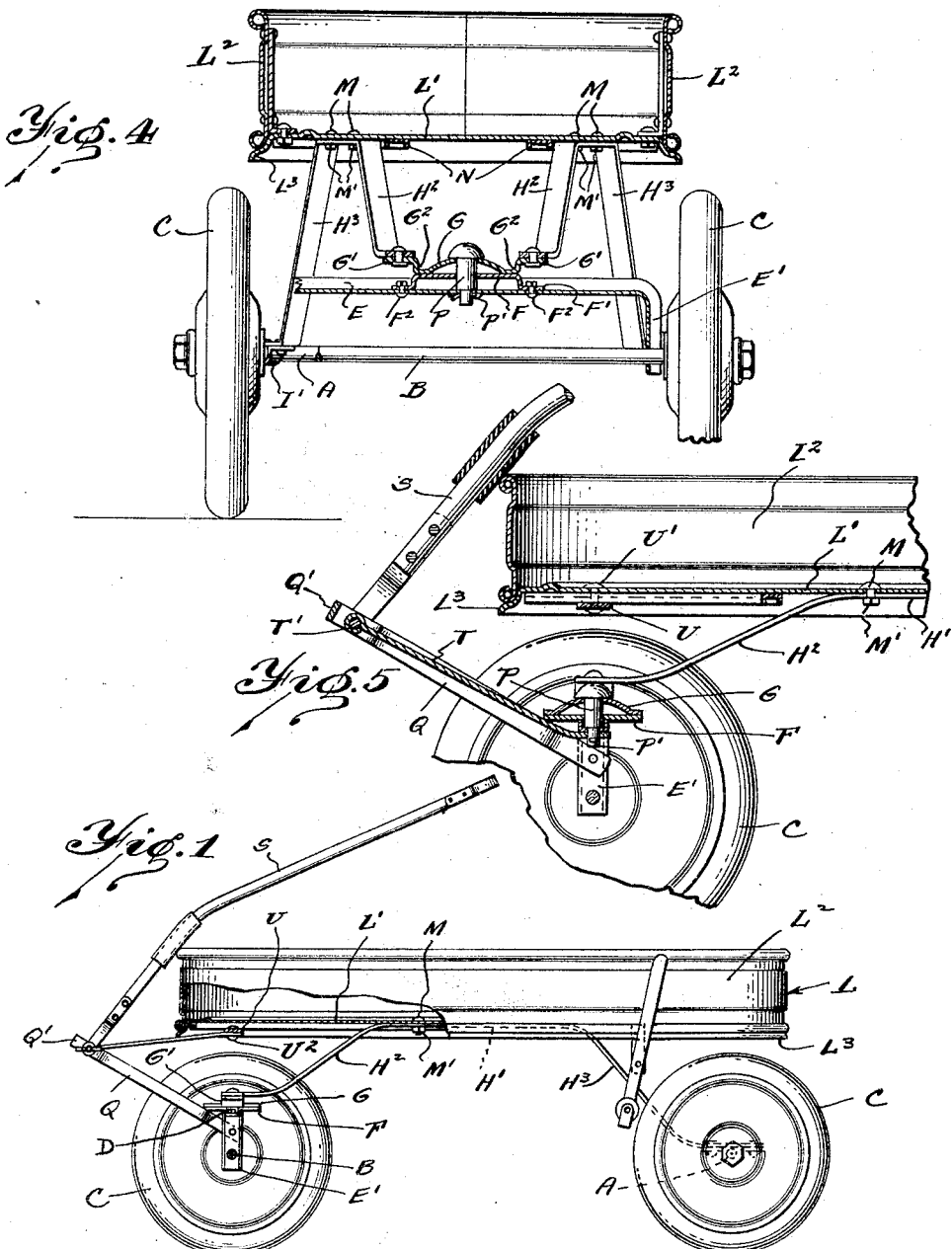

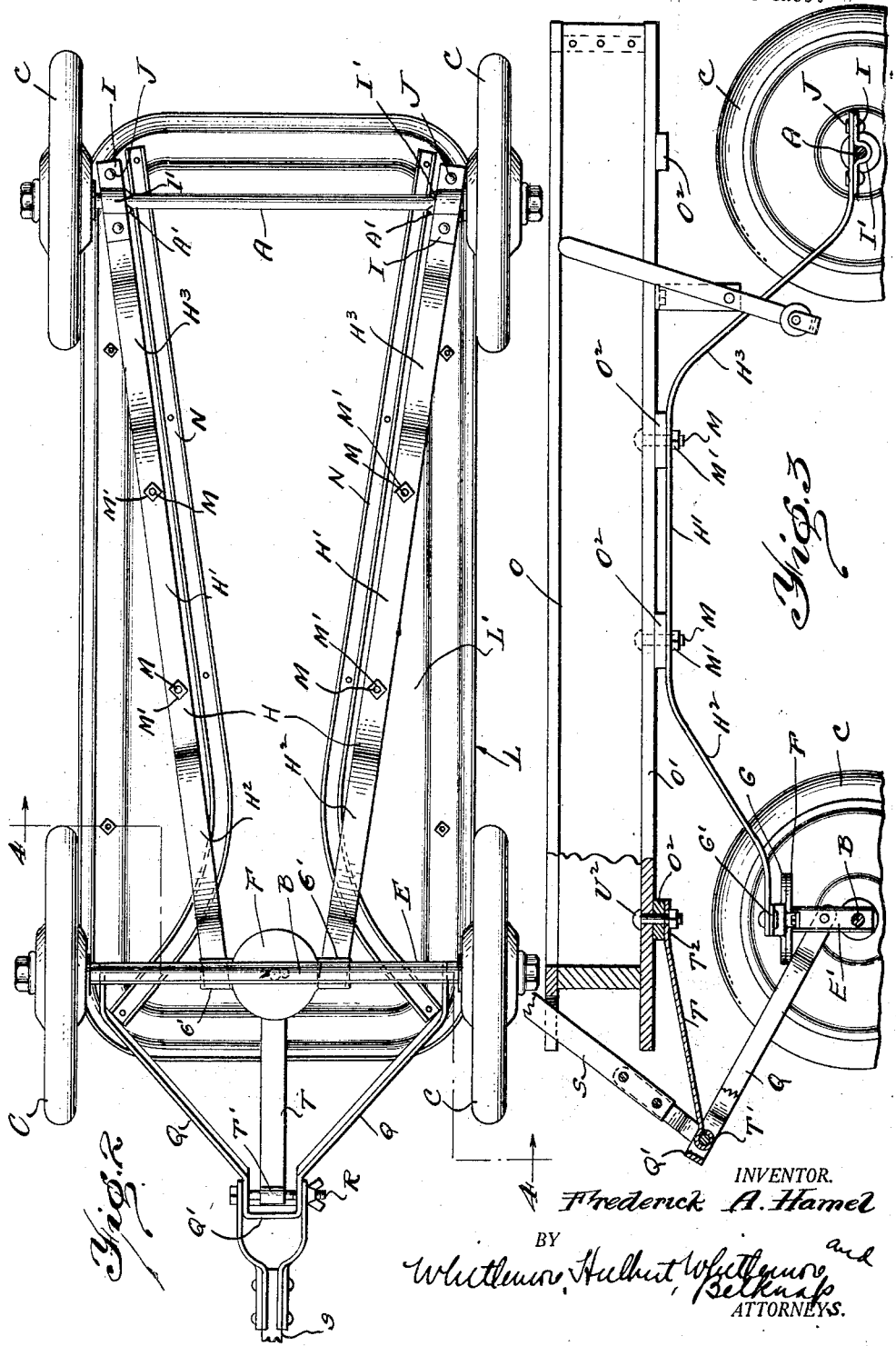

1,657,080

UNITED STATES PATENT OFFICE.

FREDERICK A. HAMEL, OF TOLEDO, OHIO, ASSIGNOR TO GENDRON WHEEL COMPANY, OF TOLEDO, OHIO, A CORPORATION OF OHIO.

CHILD'S VEHICLE.

Application filed April 26, 1926. Serial No. 104,790.

The invention relates to child's vehicles and more particularly to an improved construction of coaster wagon.

The primary object of the invention is to obtain an improved spring running gear on which the vehicle body is mounted and to this end the invention consists in the features of construction as hereinafter set forth.

In the drawings:

Figure 1 is a side elevation of a wagon provided with the spring running gear and a metal box.

Figure 2 is a bottom plan view thereof.

Figure 3 is a side elevation of the same running gear provided with a wooden box.

Figure 4 is a transverse section on line 4—4 of Figure 2.

Figure 5 is a fragmentary longitudinal section of a modified construction.

The improved spring running gear for the coaster wagon comprises the rear axle A, front axle B, supporting wheels C and the fifth wheel D. The front axle is provided with a bolster E formed of a channel member extending parallel to the axle and having laterally bent end portions E' through which the axle is inserted. F is the lower plate of the fifth wheel provided with ears F' extending into the channel member E and secured thereto by bolts or rivets F². G is the upper plate of substantially circular form having also the laterally projecting ears G' which are preferably bent upwardly at G² and then extend outwardly parallel to and slightly spaced from the channel member E. For connecting the front and rear axles there are provided two longitudinal strips H having straight intermediate portions H' and downwardly bent front and rear portions H² and H³ respectively. These two strips are attached to the rear axle A at points adjacent the supporting wheels and gradually converge toward the front axle B where they are attached to the upper plate G of the fifth wheel. Each of the strips H is preferably formed as a single continuous element of spring metal and the two strips together with the front and rear axles constitute the running gear of the wagon.

For securing the spring strips H to the rear axle there are provided the brackets I having the depressed portions I' which surround the cylindrical axle A. The axis of the depressed portion I' is slightly oblique to the longitudinal axis of the strip to conform with the angular arrangement of the spring strips with respect to the front and rear axles. The brackets I are secured to the ends of the strips H by bolts or rivets J on opposite sides of the depressed portions I'. The rear axle A is formed with struck out portions A' which engage the depressed portions I' and form spacers for determining the distance between the two spring strips. The forward end of the spring strips are preferably secured directly to the ears G' by bolts or rivets D'.

In Figure 2 the running gear is shown united to a metal box L forming the body of the vehicle, the box being mounted on the flat portions H' of the strips and projecting beyond the same on all sides. The box is rigidly secured to the running gear by the four bolts M extending through the bottom of the box and through the strips where they are provided with nuts and washers M'. The box L is preferably formed of pressed sheet metal having the bottom sheet L' and the sides L² projecting upward therefrom and also extending downward below the bottom sheet forming a marginal flange L³. In order to reinforce the metal box, channel strips N are provided, each of which extends from the rear corner of the box parallel to and adjacent the central portion H' of the spring strips. The forward end of each channel strip is curved outwardly above the portion H² of the spring strip and extends to the fore corner of the box. The channel member is suitably secured to the bottom sheet by rivets, spot welding or in any suitable manner.

The spring running gear as above described is also adapted for the mounting of a wooden box, or any other suitable body for the vehicle and as shown in Figure 3, O represents a rectangular wooden box having the floor O' beneath which are arranged a series of wooden cross members O². Preferably there are two cross members arranged in alignment with the bolt holes in the straight portion H' of the spring strips, so that the bolts M will pass through these cross members. It will thus be evident that the running gear construction is such as to interchangeably receive the wooden or the metal box.

Referring now to the steering mechanism of the running gear, P is the pivot bolt extending through the upper and lower plates G and F and also through the channelled bolster E, this bolt being provided with suitable retaining means, such as the cotter pin P'. Extending forwardly of the bolster is the hound Q and as shown in Figures 2 and 4 this comprises a metal strip having its end fixedly secured to the laterally bent portions E' of the bolster. The intermediate portions of the strip converge inwardly and extend upwardly forming at the forward end of the hound a U shaped portion Q' through which a bolt R extends. S is the handle pivotally mounted on the bolt R and preferably bent rearwardly so as to project over the wagon body in a position to facilitate the steering of the vehicle. T is a draw bar having its forward end T' provided with an aperture for the bolt R and having its rear end T² secured to the box in alignment with the pivot bolt P. In the particular construction shown, the underside of the metal body is provided with a cross strip U resting upon the reinforcing channel strip N and secured thereto by the rivets U'. The rear end of the draw bar is pivotally connected to the strip U by a bolt U² extending through both members and arranged in axial alignment with the pivot bolt P.

In the modified construction as shown in Figure 5, the draw bar T instead of being connected to the vehicle body is fastened at its rear end to the bolster by means of the pivot pin P.

From the above description it will be apparent that I have provided an improved form of spring running gear for coaster wagons which is adapted for the mounting either of metal or wooden boxes and also may be used for other vehicle body construction if desired. One of the features of the construction resides in the fact that the frame on which the body is mounted consists of two spring strips secured to the body at the central portions and projecting downwardly therefrom to form a spring for the axles. Further features reside in the fact that these two strips are secured at the outer ends of the rear axle and converge from that point forwardly until at the forward end they are much more closely spaced and can be directly secured to the fifth wheel of the front axle.

What I claim as my invention is:

In a child's vehicle, the combination with a running gear and a substantially rectangular body, of a pair of longitudinally extending springs having front and rear end portions arranged for attachment to the running gear of the vehicle, and intermediate portions arranged for attachment to the body, said end portions and intermediate portions being staggered in respect to each other and connected by portions extending downwardly and continuously outwardly to the end portions, and a pair of reinforcing strips secured to the under surface of said body and extending from the rear end thereof forwardly in a direction parallel to and adjacent the intermediate portions of said springs, said reinforcing strips having the forward ends thereof diverging and extending toward the front corners of said body, respectively.

In testimony whereof I affix my signature.

FREDERICK A. HAMEL.